United States Patent
Xie

(10) Patent No.: US 11,033,886 B2
(45) Date of Patent: Jun. 15, 2021

(54) MOLECULAR SIEVE SSZ-115, ITS SYNTHESIS AND USE

(71) Applicant: Chevron U.S.A. Inc., San Ramon, CA (US)

(72) Inventor: Dan Xie, Richmond, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 16/801,294

(22) Filed: Feb. 26, 2020

(65) Prior Publication Data

US 2020/0269224 A1    Aug. 27, 2020

Related U.S. Application Data

(60) Provisional application No. 62/811,225, filed on Feb. 27, 2019.

(51) Int. Cl.
| | |
|---|---|
| *B01J 29/70* | (2006.01) |
| *C01B 39/48* | (2006.01) |
| *C10G 47/16* | (2006.01) |
| *C10G 11/05* | (2006.01) |
| *B01J 37/00* | (2006.01) |
| *B01J 37/03* | (2006.01) |
| *B01J 37/04* | (2006.01) |

(52) U.S. Cl.
CPC .......... *B01J 29/70* (2013.01); *B01J 37/0018* (2013.01); *B01J 37/031* (2013.01); *B01J 37/04* (2013.01); *C01B 39/48* (2013.01); *C10G 11/05* (2013.01); *C10G 47/16* (2013.01); *C01P 2002/72* (2013.01); *C01P 2004/03* (2013.01)

(58) Field of Classification Search
CPC . B01J 29/00–90; B01J 37/0018; C01B 39/04; C01B 39/48; C01P 2002/72
See application file for complete search history.

(56) References Cited

U.S. PATENT DOCUMENTS

| | | |
|---|---|---|
| 4,439,409 A | 3/1984 | Puppe et al. |
| 4,826,667 A | 5/1989 | Zones et al. |
| 4,954,325 A | 9/1990 | Rubin et al. |
| 5,236,575 A | 8/1993 | Bennett et al. |
| 5,250,277 A | 10/1993 | Kresge et al. |
| 5,362,697 A | 11/1994 | Fung et al. |
| 6,077,498 A | 6/2000 | Diaz Cabanas et al. |
| 7,108,843 B2 | 9/2006 | Zones et al. |

(Continued)

FOREIGN PATENT DOCUMENTS

| | | |
|---|---|---|
| EP | 0293032 A2 | 11/1988 |
| WO | 2014099262 A1 | 6/2014 |

(Continued)

OTHER PUBLICATIONS

J.H. Biel and F. Dipierro "Hypotensives. III. Reaction Products of Acetylenic Diamines" J. Am. Chem. Soc. 1958, 80, 4614-4618.

(Continued)

*Primary Examiner* — Renee Robinson

(57) ABSTRACT

A novel synthetic crystalline molecular sieve material, designated SSZ-115, is provided. SSZ-115 can be synthesized using 1-methyl-1-[5-(trimethylammonio)pentyl]pyrrolidinium dications as a structure directing agent. SSZ-115 may be used in organic compound conversion reactions and sorptive processes.

11 Claims, 4 Drawing Sheets

(56) References Cited

U.S. PATENT DOCUMENTS

2017/0253491 A1* 9/2017 Elomari ................ C01B 39/48
2018/0002183 A1* 1/2018 Davis .................... C10G 11/05
2020/0207631 A1* 7/2020 Gallego Sanchez ..... B01J 29/40

FOREIGN PATENT DOCUMENTS

WO 2017142666 A1 8/2017
WO 2018224711 A1 12/2018

OTHER PUBLICATIONS

PCT International Search Report, International Patent Appl. No. PCT/IB2020/051618, dated May 12, 2020.
A. Jackowski, S.I. Zones, S-J. Hwang and A.W. Burton. "Diquaternary Ammonium Compounds in Zeolite Synthesis: Cyclic and Polycyclic N-Heterocycles Connected by Methylene Chains" J. Am. Chem. Soc. 2009, 131, 1092-1110.

\* cited by examiner

MOLECULAR SIEVE SSZ-115, ITS SYNTHESIS AND USE

CROSS-REFERENCE TO RELATED APPLICATIONS

This application claims priority to and the benefit of U.S. Provisional Application Ser. No. 62/811,225, filed Feb. 27, 2019.

FIELD

This disclosure relates to a novel synthetic crystalline molecular sieve designated SSZ-115, its synthesis, and its use in organic compound conversion reactions and sorption processes.

BACKGROUND

Molecular sieves are a commercially important class of materials that have distinct crystal structures with defined pore structures that are shown by distinct X-ray diffraction (XRD) patterns. The crystal structure defines cavities and channels/pores that are characteristic of the specific type of molecular sieve.

According to the present disclosure, a new crystalline molecular sieve, designated SSZ-115 and having a unique powder X-ray diffraction pattern, has been synthesized using 1-methyl-1-[5-(trimethylammonio)pentyl]pyrrolidinium dications as a structure directing agent.

SUMMARY

In one aspect, there is provided a molecular sieve having, in its as-synthesized form, a powder X-ray diffraction pattern substantially the same as shown in FIG. 1.

In its as-synthesized and anhydrous form, the molecular sieve can have a chemical composition comprising the following molar relationship:

|  | Useful | Typical |
|---|---|---|
| $SiO_2/Al_2O_3$ | 5 to 100 | 10 to 60 |
| $Q/SiO_2$ | >0 to 0.1 | >0 to 0.1 |
| $M/SiO_2$ | >0 to 0.1 | >0 to 0.1 | wherein Q comprises 1-methyl-1-[5-(trimethylammonio) pentyl]pyrrolidinium dications and M is a Group 1 or Group 2 metal (M).

In another aspect, there is provided a molecular sieve having, in its calcined form, a powder X-ray diffraction pattern substantially the same as shown in FIG. 3.

In its calcined form, the molecular sieve can have a chemical composition comprising the following molar relationship:

$Al_2O_3:(n)SiO_2$ wherein n is in a range of 5 to 100.

In a further aspect, there is provided a method of synthesizing the molecular sieve described herein, the method comprising (a) providing a reaction mixture comprising: (1) a source of silicon oxide; (2) a source of aluminum oxide; (3) a source of a Group 1 or Group 2 metal (M); (4) a structure directing agent (Q) comprising 1-methyl-1-[5-(trimethylammonio)pentyl]pyrrolidinium dications; (5) a source of hydroxide ions; and (6) water; and (b) subjecting the reaction mixture to crystallization conditions sufficient to form crystals of the molecular sieve.

In yet a further aspect, there is provided a process of converting a feedstock comprising an organic compound to a conversion product which comprises contacting the feedstock at organic compound conversion conditions with a catalyst comprising the molecular sieve described herein.

DETAILED DESCRIPTION

Definitions

Figure 1:
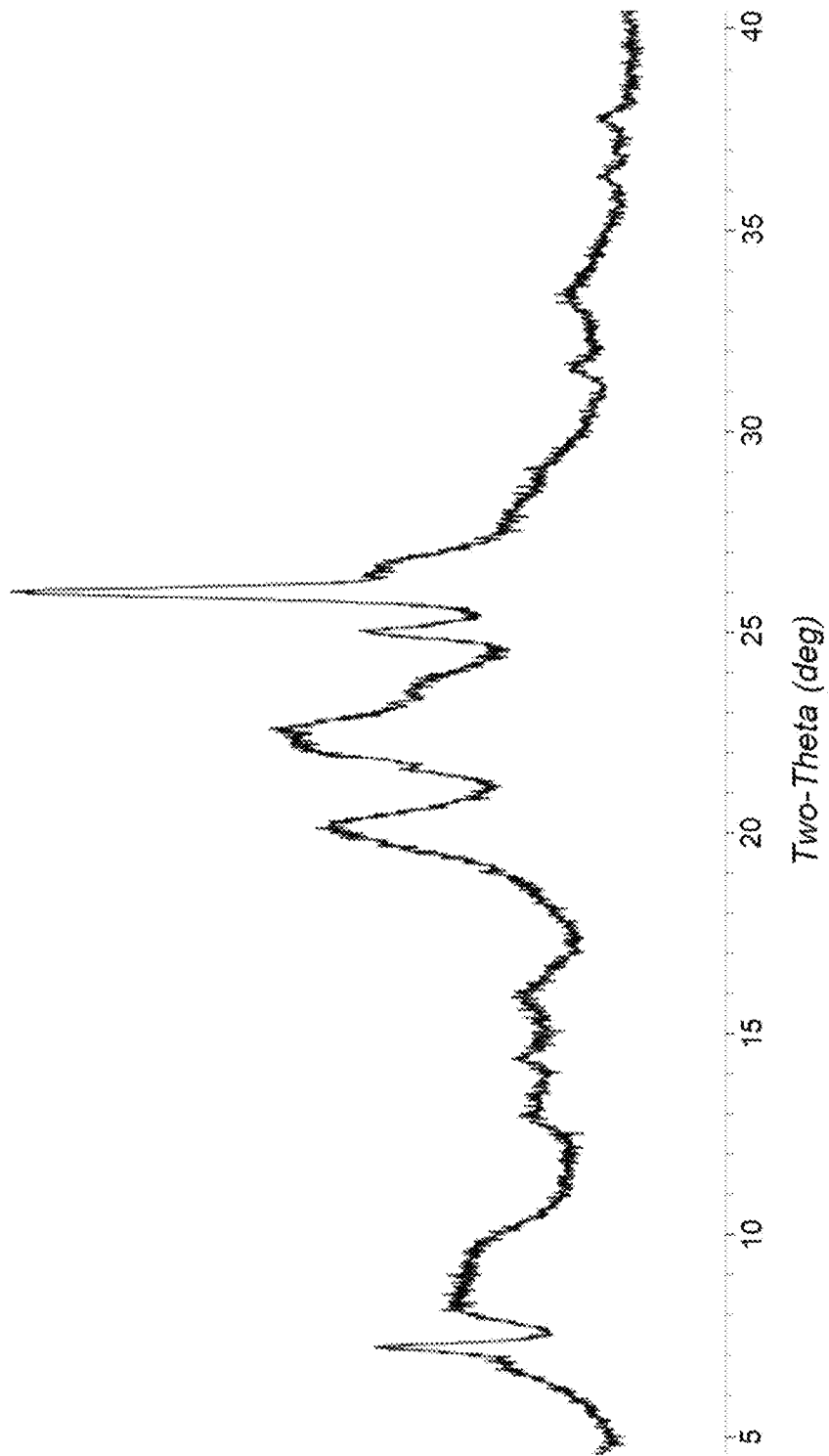
FIG. 1 shows the powder X-ray diffraction (XRD) pattern of the as-synthesized molecular sieve product of Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

Molecular sieve SSZ-115 can be synthesized by: (a) providing a reaction mixture comprising (1) a source of silicon oxide; (2) a source of aluminum oxide; (3) a source of a Group 1 or Group 2 metal (M); (4) a structure directing agent (Q) comprising 1-methyl-1-[5-(trimethylammonio) pentyl]pyrrolidinium dications; (5) a source of hydroxide ions; and (6) water; and (b) subjecting the reaction mixture to crystallization conditions sufficient to form crystals of the molecular sieve.

The reaction mixture can have a composition, in terms of molar ratios, within the ranges set forth in Table 1:

TABLE 1

| Reactants | Useful | Typical |
|---|---|---|
| $SiO_2/Al_2O_3$ | 5 to 100 | 10 to 80 |
| $M/SiO_2$ | 0.05 to 0.50 | 0.10 to 0.50 |
| $Q/SiO_2$ | 0.05 to 0.50 | 0.05 to 0.20 |
| $OH/SiO_2$ | 0.10 to 0.60 | 0.20 to 0.50 |
| $H_2O/SiO_2$ | 10 to 60 | 15 to 40 |

Suitable sources of silicon oxide include colloidal silica, fumed silica, precipitated silica, alkali metal silicates, and tetraalkyl orthosilicates.

Suitable sources of aluminum oxide include hydrated alumina, aluminum hydroxide, alkali metal aluminates, aluminum alkoxides, and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

The Group 1 or Group 2 metal (M) can be any M-containing compound not detrimental to crystallization process. The Group 1 or Group 2 metal can be sodium or potassium. Sources of the Group 1 or Group 2 metal can include metal hydroxide, metal oxide, metal halide, metal sulfate, metal nitrate, and metal carboxylate. As used here, the phrase "Group 1 or Group 2 metal" does not mean the Group 1 metals and Group 2 metals are used in the alternative, but instead that one or more Group 1 metals can be used alone or in combination with one or more Group 2 metals and that one or more Group 2 metals can be used alone or in combination with one or more Group 1 metals. Typically, Group 1 metals are preferred. Suitable Group 1 or Group 2 metals include sodium, potassium, calcium, and combinations thereof.

The structure directing agent (Q) comprises 1-methyl-1-[5-(trimethylammonio)pentyl]pyrrolidinium dications, represented by the following structure (1):

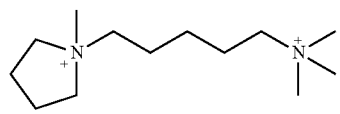

(1)

Suitable sources of Q are the hydroxides and/or other salts of the diquaternary ammonium compound.

The reaction mixture may contain seeds of a molecular sieve material, such as SSZ-115 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-115 over any undesired phases.

The reaction mixture components can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless steel autoclaves, at a temperature of from 125° C. to 200° C. (e.g., 140° C. to 170° C.) for a time sufficient for crystallization to occur (e.g., from about 2 to 40 days, or from 5 to 30 days). Crystallization is usually conducted in an autoclave so that the reaction mixture is subject to autogenous pressure.

Once the molecular sieve crystals have formed, the solid product is recovered from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., about 4 to 24 hours for oven drying at 75° C. to 150° C.), to obtain as-synthesized SSZ-115 crystals. The drying step can be performed at atmospheric pressure or under vacuum.

As a result of the crystallization process, the recovered crystalline molecular sieve product contains within its pore structure at least a portion of the structure directing agent used in the synthesis.

The as-synthesized molecular sieve can be subjected to treatment to remove part or all of the structure directing agent used in its synthesis. Removal of the structure directing agent can be carried out by thermal treatment (e.g., calcination) in which the as-synthesized zeolite is heated at a temperature sufficient to remove part or all of the structure directing agent. While sub-atmospheric pressure can be used for the thermal treatment, atmospheric pressure is desired for reasons of convenience. The thermal treatment can be performed at a temperature at least 370° C. for at least a minute and generally not longer than 20 hours (e.g., from 1 to 12 hours). The thermal treatment can be performed at a temperature of up to 925° C. For example, the thermal treatment can be conducted at a temperature of 400° C. to 700° C. in the presence of an oxygen-containing gas for approximately 1 to 8 hours. Additionally or alternatively, the structure directing agent can be removed by treatment with ozone.

To the extent desired, any cations in the as-synthesized molecular sieve can be replaced in accordance with techniques well known in the art by ion exchange with other cations. Preferred replacing cations include metal ions, hydrogen ions, hydrogen precursor (e.g., ammonium) ions and mixtures thereof. Particularly preferred replacing cations are those which tailor the catalytic activity for certain organic conversion reactions. These include hydrogen, rare earth metals and metals of Groups 2 to 15 of the Periodic Table of the Elements.

Characterization of the Molecular Sieve

In its as-synthesized and anhydrous form, molecular sieve SSZ-115 can have a chemical composition comprising the following molar relationship as described in Table 2:

TABLE 2

|  | Useful | Typical |
| --- | --- | --- |
| $SiO_2/Al_2O_3$ | 5 to 100 | 10 to 60 |
| $Q/SiO_2$ | >0 to 0.1 | >0 to 0.1 |
| $M/SiO_2$ | >0 to 0.1 | >0 to 0.1 | wherein compositional variables Q and M are as described herein above.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-115 can have a chemical composition comprising the following molar relationship:

$Al_2O_3:(n)SiO_2$ wherein n is in a range of 5 to 100 (e.g., 5 to 75, 5 to 60, 5 to 50, 10 to 100, 10 to 75, or 10 to 60).

Figure 3:
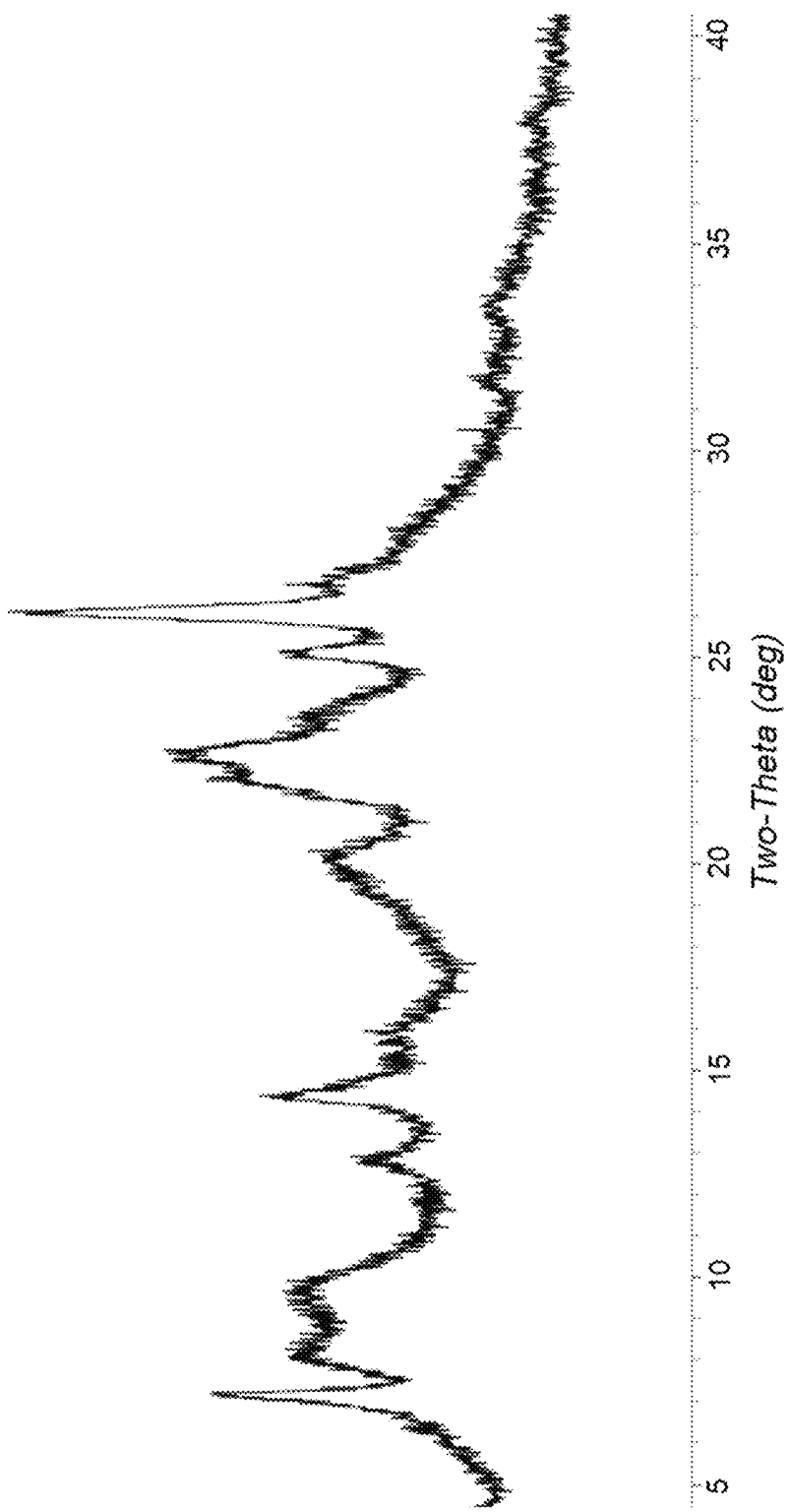
FIG. 3 shows the powder XRD pattern of the calcined molecular sieve product of Example 6.

The as-synthesized and calcined forms of SSZ-115 have characteristic powder X-ray diffraction patterns. In its as-synthesized form, the molecular sieve has a powder XRD pattern substantially the same as shown in FIG. 1. In its calcined form, the molecular sieve has a powder XRD pattern substantially the same as shown in FIG. 3. As used herein, the phrase "substantially the same" means the patterns are qualitatively the same with regard to the locations of the peaks. One skilled in the art would be able to determine if two materials have substantially the same powder X-ray diffraction patterns.

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

Molecular sieve SSZ-115 may be used as a sorbent or as a catalyst to catalyze a wide variety of organic compound conversion processes including many of present commercial/industrial importance. Examples of chemical conversion processes which are effectively catalyzed by SSZ-115, by itself or in combination with one or more other catalytically active substances including other crystalline catalysts, include those requiring a catalyst with acid activity. Examples of organic conversion processes which may be catalyzed by SSZ-115 include cracking, hydrocracking, disproportionation, alkylation, oligomerization, and isomerization.

As in the case of many catalysts, it may be desirable to incorporate SSZ-115 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-115 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-115 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-115 also include inorganic oxides, such as silica, zirconia, titania, magnesia, beryllia, alumina, and mixtures thereof.

In addition to the foregoing materials, SSZ-115 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-115 and inorganic oxide matrix may vary widely, with the SSZ-115 content ranging from 1 to 90 wt. % (e.g., 2 to 80 wt. %) of the composite.

EXAMPLES

The following illustrative examples are intended to be non-limiting.

Example 1

10.20 g of deionized water, 0.64 g of an aqueous 50% NaOH solution, 4.79 g of a 16.72% 1-methyl-1-[5-(trimethylammonio)pentyl]pyrrolidinium hydroxide solution and 2.00 g of CBV720 Y-zeolite powder (Zeolyst International, $SiO_2/Al_2O_3$ molar ratio=30) were mixed together in a Teflon liner. The resulting gel was stirred until it became homogeneous. The liner was then capped and placed within a Parr steel autoclave reactor. The autoclave was then placed in an oven and the heated at 150° C. for 10 days under static conditions. The solid products were recovered by centrifugation, washed with deionized water and dried at 95° C.

Figure 2:
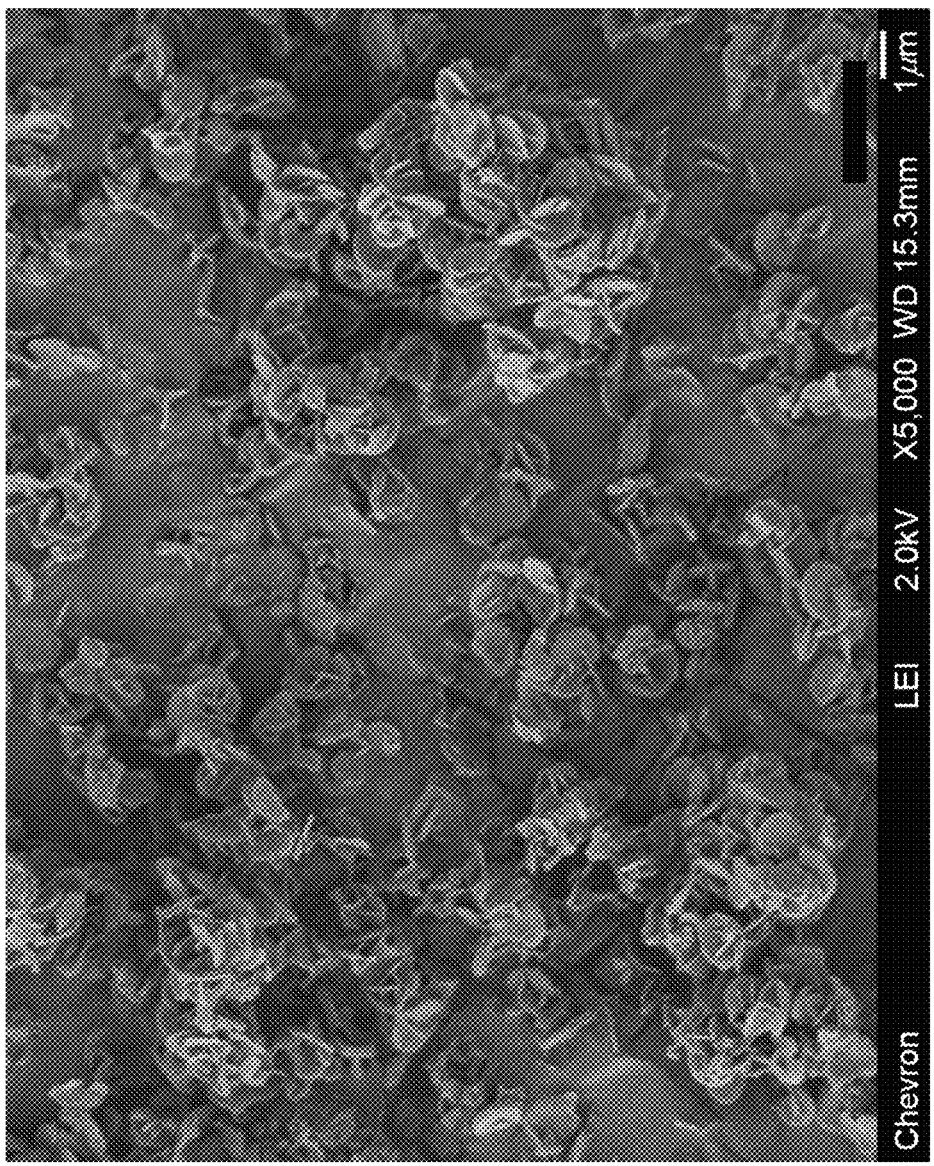
FIG. 2 is a Scanning Electron Micrograph (SEM) image of the as-synthesized molecular sieve product of Example 1.

Powder XRD of the as-synthesized product gave the pattern indicated in FIG. 1 and showed the product to be a pure form of a new molecular sieve phase, designated SSZ-115. A SEM image of the as-synthesized product is shown in FIG. 2 indicating a uniform field of crystals.

The product had a $SiO_2/Al_2O_3$ molar ratio of 20.9, as determined by inductively coupled plasma (ICP) elemental analysis.

Example 2

10.27 g of deionized water, 0.52 g of an aqueous 50% NaOH solution, 4.79 g of a 16.72% 1-methyl-1-[5-(trimethylammonio)pentyl]pyrrolidinium hydroxide solution and 2.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr steel autoclave reactor. The autoclave was then placed in an oven and the heated at 150° C. for 8 days under static conditions. The solid products were recovered by centrifugation, washed with deionized water and dried at 95° C.

The resulting product was identified by powder XRD and SEM as a pure SSZ-115 molecular sieve.

The product had a $SiO_2/Al_2O_3$ molar ratio of 55.9, as determined by ICP elemental analysis.

Example 3

5.23 g of deionized water, 0.30 g of an aqueous 50% NaOH solution, 5.56 g of a 16.72% 1-methyl-1-[5-(trimethylammonio)pentyl]pyrrolidinium hydroxide solution, 0.25 g of 50% Reheis F-2000 aluminum hydroxide dried gel and 5.00 g of LUDOX® AS-30 colloidal silica (30 wt. % suspension in water) were mixed together in a Teflon liner.

The resulting gel was stirred until it became homogeneous. The liner was then capped and placed within a Parr steel autoclave reactor. The autoclave was then placed in an oven and the heated at 160° C. for 18 days with tumbling at 43 rpm. The solid products were recovered by centrifugation, washed with deionized water and dried at 95° C.

The resulting product was identified by powder XRD and SEM as a pure SSZ-115 molecular sieve.

The product had a $SiO_2/Al_2O_3$ molar ratio of 20.1, as determined by ICP elemental analysis.

Example 4

3.14 g of deionized water, 0.28 g of an aqueous 45% KOH solution, 3.34 g of a 16.72% 1-methyl-1-[5-(trimethylammonio)pentyl]pyrrolidinium hydroxide solution, 0.15 g of 50% Reheis F-2000 aluminum hydroxide dried gel and 3.00 g of LUDOX® AS-30 colloidal silica were mixed together in a Teflon liner. The resulting gel was stirred until it became homogeneous. The liner was then capped and placed within a Parr steel autoclave reactor. The autoclave was then placed in an oven and the heated at 160° C. for 30 days with tumbling at 43 rpm. The solid products were recovered by centrifugation, washed with deionized water and dried at 95° C.

The resulting product was identified by powder XRD and SEM as a pure SSZ-115 molecular sieve.

The product had a $SiO_2/Al_2O_3$ molar ratio of 20.0, as determined by ICP elemental analysis.

Example 5

0.24 g of an aqueous 50% NaOH solution, 2.23 g of a 16.72% 1-methyl-1-[5-(trimethylammonio)pentyl]pyrrolidinium hydroxide solution, 0.20 g of 50% Reheis F-2000 aluminum hydroxide dried gel and 3.00 g of LUDOX® AS-30 colloidal silica were mixed together in a Teflon liner. The resulting gel was stirred until it became homogeneous. The liner was then capped and placed within a Parr steel autoclave reactor. The autoclave was then placed in an oven and the heated at 160° C. for 11 days with tumbling at 43 rpm. The solid products were recovered by centrifugation, washed with deionized water and dried at 95° C.

The resulting product was identified by powder XRD and SEM as a pure SSZ-115 molecular sieve.

The product had a $SiO_2/Al_2O_3$ molar ratio of 12.5, as determined by ICP elemental analysis.

Example 6

The as-synthesized molecular sieve of Example 1 was calcined inside a muffle furnace under a flow of air heated to 540° C. at a rate of 1° C./minute and held at 540° C. for 5 hours, cooled and then analyzed by powder XRD.

Powder XRD of the calcined product gave the pattern indicated in FIG. 3 and showed the material to be stable after calcination to remove the organic structure directing agent.

Figure 4:
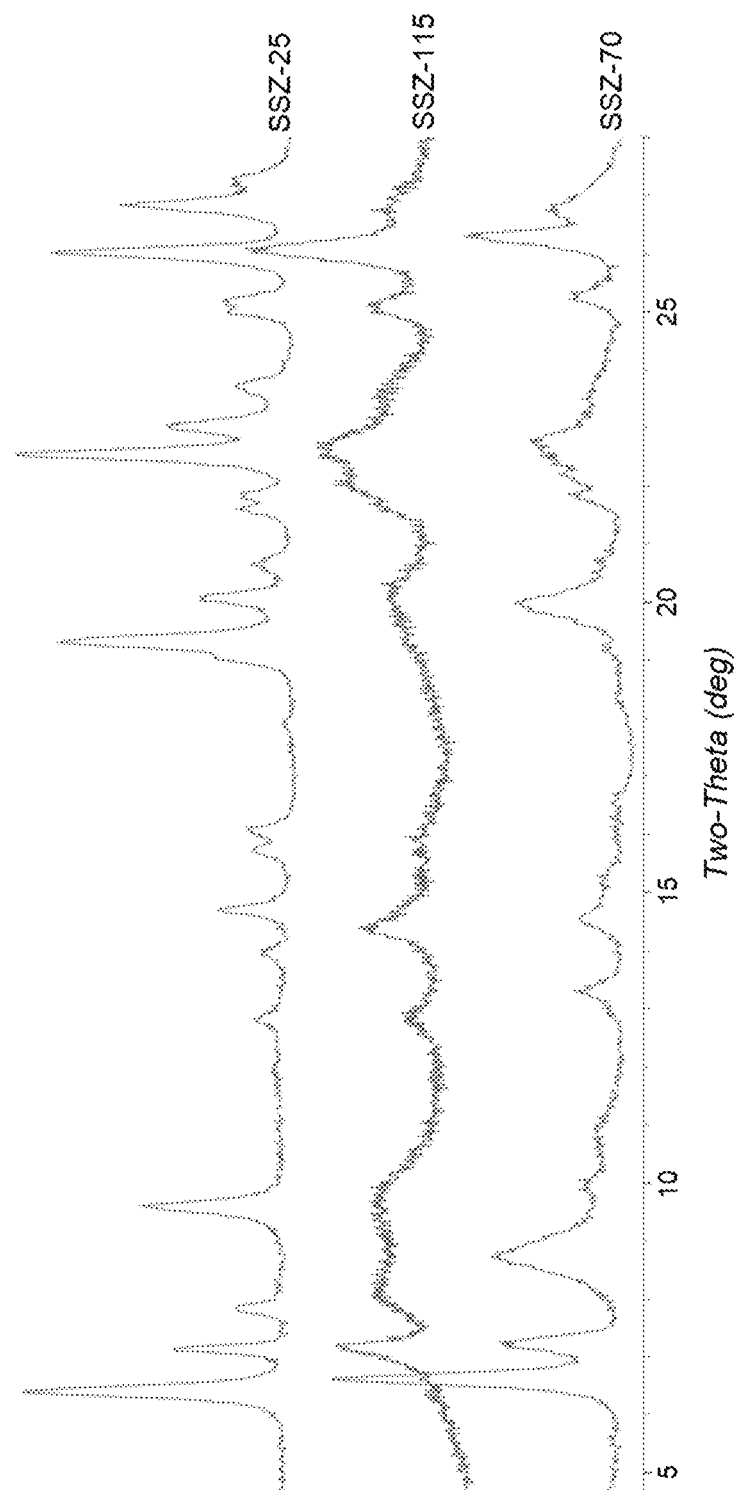
FIG. 4 shows a comparison of the powder XRD patterns of SSZ-25 (MWW-type framework, top XRD pattern), SSZ-70 (*-SVY-type framework, bottom XRD pattern) and calcined SSZ-115 (middle XRD pattern).

FIG. 4 shows a comparison of the powder XRD patterns of SSZ-25 (MWW-type framework, top XRD pattern), SSZ-70 (*-SVY-type framework, bottom XRD pattern) and calcined SSZ-115 (middle XRD pattern).

Example 7

The calcined molecular sieve material of Example 4 was treated with 10 mL (per g of molecular sieve) of a 1N ammonium nitrate solution at 95° C. for 2 hours. The mixture was cooled, the solvent decanted off and the same process repeated.

After drying, the product ($NH_4$—SSZ-115) was subjected to micropore volume analysis using $N_2$ an adsorbate and via the B.E.T.method. The molecular sieve had a micropore volume of 0.12 $cm^3/g$.

The invention claimed is:

1. A molecular sieve having, in its calcined form, a powder X-ray diffraction pattern substantially the same as shown in FIG. 3.

2. The molecular sieve of claim 1, and having a composition comprising the molar relationship:

$Al_2O_3:(n)SiO_2$ wherein n is in a range of 5 to 100.

3. The molecular sieve of claim 1, and having a composition comprising the molar relationship:

$Al_2O_3:(n)SiO_2$ wherein n is in a range of 10 to 60.

4. A molecular sieve having, in its as-synthesized form, a powder X-ray diffraction pattern substantially the same as shown in FIG. 1.

5. The molecular sieve of claim 4, having a chemical composition comprising the following molar relationship:

| | |
|---|---|
| $SiO_2/Al_2O_3$ | 5 to 100 |
| $Q/SiO_2$ | >0 to 0.1 |
| $M/SiO_2$ | >0 to 0.1 | wherein Q comprises 1-methyl-1-[5-(trimethylammonio)pentyl]pyrrolidinium dications and M is a Group 1 or Group 2 metal.

6. The molecular sieve of claim 4, having a chemical composition comprising the following molar relationship:

| | |
|---|---|
| $SiO_2/Al_2O_3$ | 10 to 60 |
| $Q/SiO_2$ | >0 to 0.1 |
| $M/SiO_2$ | >0 to 0.1 | wherein Q comprises 1-methyl-1-[5-(trimethylammonio)pentyl]pyrrolidinium dications and M is a Group 1 or Group 2 metal.

7. A method of synthesizing the molecular sieve of claim 4, the method comprising:
(a) providing a reaction mixture comprising:
(1) a source of silicon oxide;
(2) a source of aluminum oxide;
(3) a source of a Group 1 or Group 2 metal (M);
(4) a structure directing agent (Q) comprising 1-methyl-1-[5-(trimethylammonio)pentyl]pyrrolidinium dications;
(5) a source of hydroxide ions; and
(6) water; and
(b) subjecting the reaction mixture to crystallization conditions sufficient to form crystals of the molecular sieve.

8. The method of claim 7, wherein the reaction mixture has a composition, in terms of molar ratios, as follows:

| | |
|---|---|
| $SiO_2/Al_2O_3$ | 5 to 100 |
| $M/SiO_2$ | 0.05 to 0.50 |
| $Q/SiO_2$ | 0.05 to 0.50 |

-continued

|        |              |
|--------|--------------|
| OH/SiO$_2$ | 0.10 to 0.60 |
| H$_2$O/SiO$_2$ | 10 to 60. |

9. The method of claim 7, wherein the reaction mixture has a composition, in terms of molar ratios, as follows:

|        |              |
|--------|--------------|
| SiO$_2$/Al$_2$O$_3$ | 10 to 80 |
| M/SiO$_2$ | 0.10 to 0.50 |
| Q/SiO$_2$ | 0.05 to 0.20 |
| OH/SiO$_2$ | 0.20 to 0.50 |
| H$_2$O/SiO$_2$ | 15 to 40. |

10. The method of claim 7, wherein the crystallization conditions include a temperature of from 125° C. to 200° C.

11. A process for converting a feedstock comprising an organic compound to a conversion product, the process comprising contacting the feedstock at organic compound conversion conditions with a catalyst comprising the molecular sieve of claim 1.

* * * * *